United States Patent
Yiu et al.

(10) Patent No.: US 11,044,626 B2
(45) Date of Patent: Jun. 22, 2021

(54) SYSTEMS, METHODS, AND APPARATUSES FOR CONFIGURING MEASUREMENT GAP PER FREQUENCY GROUP AND PER CELL

(71) Applicant: APPLE INC., Cupertino, CA (US)

(72) Inventors: Candy Yiu, Portland, OR (US); Jie Cui, Santa Clara, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 27 days.

(21) Appl. No.: 16/487,688

(22) PCT Filed: Mar. 12, 2018

(86) PCT No.: PCT/US2018/021926
§ 371 (c)(1),
(2) Date: Aug. 21, 2019

(87) PCT Pub. No.: WO2018/169829
PCT Pub. Date: Sep. 20, 2018

(65) Prior Publication Data
US 2020/0236572 A1    Jul. 23, 2020

Related U.S. Application Data

(60) Provisional application No. 62/471,235, filed on Mar. 14, 2017.

(51) Int. Cl.
*H04W 24/10* (2009.01)
*H04L 5/00* (2006.01)
*H04W 36/00* (2009.01)

(52) U.S. Cl.
CPC .......... *H04W 24/10* (2013.01); *H04L 5/0007* (2013.01); *H04L 5/0057* (2013.01); *H04W 36/0088* (2013.01)

(58) Field of Classification Search
CPC .............. H04W 36/0088; H04W 24/10; H04L 5/0007; H04L 5/0057
(Continued)

(56) References Cited

U.S. PATENT DOCUMENTS 10,200,896 B2 *  2/2019  Choi ..................... H04W 24/10
2011/0170483 A1 *  7/2011  Ishii .................. H04W 72/0446
                                                          370/328
(Continued)

FOREIGN PATENT DOCUMENTS

WO    2016068642 A1    11/2016
WO    2016182534 A1    11/2016
WO    2017027066 A1     2/2017

OTHER PUBLICATIONS

MCC Support, "Draft Report of 3GPP TSG RAN WG1 #88, V0.1.0", R1-17xxxxx, Spokane, Washington, USA, Apr. 3-7, 2017, 145 pages.
(Continued)

*Primary Examiner* — Robert J Lopata
(74) *Attorney, Agent, or Firm* — Stoel Rives LLP

(57) ABSTRACT

Systems, methods, and apparatuses may configure a measurement gap per frequency group and per cell. Measurement time and frequency resources may be associated with a carrier frequency, a cell, or both. Thus, a user equipment (UE) may determine the measurement configuration based on the carrier frequency, cell, or both. The number of synchronization sequences (SS) blocks in an SS burst may be based on the frequency band of the carrier frequency.

16 Claims, 7 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 2012/0252487 | A1* | 10/2012 | Siomina | G01S 5/10 |
| | | | | 455/456.1 |
| 2014/0362716 | A1* | 12/2014 | Zhang | H04W 36/0088 |
| | | | | 370/252 |
| 2015/0245235 | A1 | 8/2015 | Tang et al. | |
| 2015/0327104 | A1* | 11/2015 | Yiu | H04W 24/02 |
| | | | | 455/450 |
| 2016/0302094 | A1* | 10/2016 | Yum | H04W 24/10 |
| 2017/0055202 | A1* | 2/2017 | Uchiyama | H04W 52/0209 |
| 2017/0311230 | A1* | 10/2017 | Yang | H04W 48/16 |
| 2018/0076872 | A1* | 3/2018 | Li | H04W 72/048 |
| 2018/0091196 | A1* | 3/2018 | Frenne | H04L 5/005 |
| 2018/0091212 | A1* | 3/2018 | Lee | H04B 7/0695 |
| 2018/0302842 | A1* | 10/2018 | Sugirtharaj | H04L 5/0048 |
| 2019/0104549 | A1* | 4/2019 | Deng | H04B 7/0617 |

OTHER PUBLICATIONS

NTT Docomo, et al., "WF on NR-SS periodicity", R1-1703593, #GPP TSG RAN WG1 Meeting #88, Athens, Greece, Agenda Item 8.1.1.1.4, Feb. 13-17, 2017, 150 pages.
PCT/US2018/021926, International Search Report and Written Opinion, dated Jun. 7, 2018, 21 pages.

\* cited by examiner

SYSTEMS, METHODS, AND APPARATUSES FOR CONFIGURING MEASUREMENT GAP PER FREQUENCY GROUP AND PER CELL

RELATED APPLICATIONS

This application is a non-provisional of U.S. Provisional Patent Application No. 62/471,235, filed Mar. 14, 2017, which is incorporated by reference herein in its entirety.

TECHNICAL FIELD

The present disclosure relates to cellular networks and more specifically to measurement gap configuration in cellular systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node.

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN 106 implements universal mobile telecommunication system (UMTS) RAT or other 3GPP RAT, and the E-UTRAN implements LTE RAT. A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION OF PREFERRED EMBODIMENTS

Figure 1:
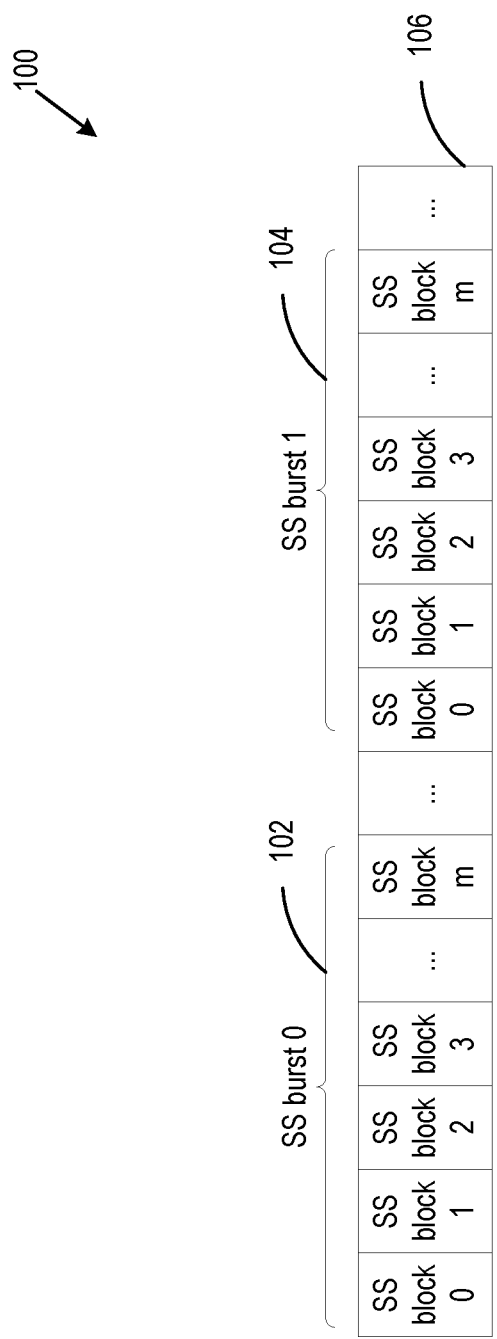
FIG. 1 is a schematic diagram illustrating a scheduled measurement gap by a gNB for one or more UEs to perform intrafrequency/interfrequency measurements consistent with embodiments disclosed herein.

Described herein are embodiments of systems, methods, and apparatuses for configuring measurement patterns and measurement gaps per frequency group and per cell. A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable new radio (NR, also known as fifth generation (5G) radio or fifth generation long term evolution (5G LTE)) to allow measurement gap configuration per frequency group and/or cell. The measurement gap may be required for intrafrequency/interfrequency measurement. Measurements on the transmission (Tx) and reception (Rx) beams are used to enable handover, beam selection and/or switching operations. The beam specific reference signal (BRS) can be used for NR beam selection/switching operations. Long term evolution (LTE) cell specific reference signals (CRSs) are used in long term evolution (LTE) for the mobility measurements (e.g., handover and cell selection/reselection). BRS can be used for the legacy cell specific mobility management and also the beam access.

Traditionally, a network configures measurement gap per user equipment (UE). This UE configuration simply configures whether there is a measurement gap or no gap. However, measurement gap per component carrier (CC) may be performed by taking into account UE capability signaling. The UE can signal gap preference indication as per CC after the network has configured carrier aggregation (CA) configuration and measurement object.

In NR, extending the mobility communication to the high frequency carriers (such as carriers with frequencies greater than 6 GHz) with the basic coverage, a measurement gap configuration per frequency group and/or cell approach is one of the promising solutions. Because NR supports a large range of frequencies, user equipment (UE) may include multiple radio frequency elements to cover the large range. By partitioning the frequencies supported by NR into band groups, a UE can be configured to utilize the resource efficiently.

In NR implementations, a per-frequency carrier or even a per-cell measurement configuration may be used due to different synchronization sequences (SS) burst periodicity that may be signaled in different frequency(ies) or cell(s). SS burst may also be referred to as an SS block. This information may need to be signaled to the UE so that the UE can perform measurements accordingly. The per-cell measurement configuration and the per-frequency measurement configuration may comprise time and/or frequency resources in which a synchronization signal burst is allocated. In various embodiments, this information may be incorporated into measurement gap configuration to allow the network to configure measurement gap per-frequency or per-cell similar to the per-CC measurement gap configuration with modification. In some embodiments, the network may signal this information when configuring the UE serving band and measurement configuration. This way, the UE can use a preference indication to indicate which measurement gap is required similar to per-CC measurement gap configuration.

Various embodiments may include one or more of the following features: measurement information/configuration per frequency carrier; measurement information/configuration per cell; and/or measurement information/configuration per frequency band group with autonomous gap.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 shows a diagram of a scheduled measurement gap 100 for UEs performing measurements while measuring a cell or a using a frequency. A fifth generation node B (gNB or 5G eNB) may configure the scheduled measurement gap 100 per frequency or cell. The per-cell measurement configuration and the per-frequency measurement configuration may comprise time and/or frequency resources in which an SS burst is allocated. UEs associated with a cell or using a frequency for which the measurement gap 100 was configured may perform measurements during the synchronization sequences (SS) bursts 102, 104.

The SS bursts 102, 104 may be a set of subframes in which the gNB prevents scheduling the UE. Thus, the UE is available to perform a set of measurements during the SS bursts 102, 104. The SS bursts 102, 104 may comprise a plurality of SS blocks 106 that define the timing/duration of the SS bursts 102, 104. The periodicity or pattern of the SS bursts 102, 104, as well as the number of SS blocks 106 per SS bursts, may be configured based on an associated cell, frequency, and/or frequency band group.

In some embodiments, the periodicity of the SS bursts 102, 104 may be determined based on a frequency carrier. For example, the gNB may configure select frequencies or frequency band groups with a measurement gap periodicity.

The gNB may provide an information element to UEs informing the UEs of measurement gap periodicity associated with various frequencies. If the UE uses one of the various frequencies for communication, the UE may perform measurement gap functions during the associated measurement gap.

In some embodiments, for detecting a non-standalone NR cell, an NR network can support adaptation and provide a network indication of SS burst set periodicity and information to derive measurement timing/duration (e.g., time window for NR-SS detection). For detecting a non-standalone NR cell, the NR network can provide one SS burst set periodicity information per frequency carrier to a UE and information to derive measurement timing/duration. In embodiments where one SS burst set periodicity and information regarding timing/duration are indicated, a UE may assume the periodicity and timing/duration for all cells on the same carrier. In some embodiments, the SS burst set may have a short measurement duration for a configured periodicity, e.g., 1, 5 or 10 ms. L1/L3 filtering across multiple periods may still be allowed. In some embodiments, more than one periodicity/timing/duration indication may be used.

An NR network may support a set of SS burst set periodicity values for adaptation and network indication. For example, periodicity values may include 20, 40, 80 and 160 ms. In some embodiments, other values may be used with consideration for functionalities provided by NR-SS in connected mode. In some embodiments, per frequency configuration of the gap measurement may support NR-PBCH in a non-standalone NR cell.

In some embodiments, for initial cell selection for an NR cell, a UE can assume the following default SS burst set periodicity. For example, the UE may assume a first periodicity for a carrier frequency range category #A. For example, carrier frequency range category #A could have a periodicity associated with it of among 10-20 ms. In some embodiments, the carrier frequency range category #A may include 0~6 GHz.

The UE may assume a second periodicity for a carrier frequency range category #B. For example, carrier frequency range category #B could have a periodicity associated with it of among 10-20 ms. In some embodiments, the carrier frequency range category #B may include 6~60 GHz. Down-selection may consider the SS block dimensions, initial access latency, power consumption, and detection performance aspects. Other considerations are not precluded.

Note that these example ranges do not preclude further sub-categorization of frequency ranges. And additional frequency sub-ranges defined can support a single default SS burst set periodicity value selected between 10 and 20 ms. Note that this does not preclude additional categorization of frequency ranges not covered by #A and #B. SS burst set periodicity for potential additional frequency ranges may be configured as desired. In some embodiments, the values of frequency ranges may be changed. The exact frequency ranges for categories #A and #B may also be adjusted. In some embodiments, the UE is not expected to detect cells that do not conform to the default SS burst set periodicity.

In some embodiments, for CONNECTED and IDLE mode UEs, NR can support network indication of SS burst set periodicity and information to derive measurement timing/duration (e.g., time window for NR-SS detection). For example, the network can provide one SS burst set periodicity information per frequency carrier to UE and information to derive measurement timing/duration. In embodiments where one SS burst set periodicity and one information regarding timing/duration are indicated, the UE can assume the periodicity and timing/duration for all cells on the same carrier. In some embodiments, the measurement duration may be 1, 5 or 10 ms. L1/L3 filtering across multiple periods may still be allowed. In some embodiments, more than one periodicity/timing/duration indication may be used.

In some embodiments, if the network does not provide indication of SS burst set periodicity and information to derive measurement timing/duration the UE can assume a default duration, such as 5 ms, as the SS burst set periodicity. NR may support a set of SS burst set periodicity values for adaptation and network indication. In some embodiments, periodicity values may be 5, 10, 20, 40, 80 or 160 ms.

Base on the above, the NR SS (xSS) in the SS burst set may be configured differently per frequency carrier. Therefore, it may impact how the network can configure the user equipment (UE) measurement configuration. Various embodiments provide flexible measurement configurations, which may accommodate the flexible NR design.

In some embodiments, the periodicity of the SS bursts 102, 104 may be cell specific. For example, the gNB may configure each cell with a measurement gap periodicity. The gNB may provide an information element to UEs informing the UEs of measurement gap periodicity associated with a cell. The information element may identify the cell with a cell identifier such as a physical cell identifier (PCI) and provide the periodicity used by the cell. Thus, the UE may determine the periodicity of a measurement gap periodicity based on the cell.

In some embodiments, the periodicity of the SS bursts 102, 104 may be determined based on both a carrier frequency and/or cell. This information may be distributed to a UE via an information element (IE). An IE may include elements associated with the cell and variables associated with the carrier frequency. Both elements/fields may comprise time and/or frequency resources in which the SS burst(s) may be allocated. Both elements/fields may comprise central frequency, bandwidth, and other like information to perform measurements. In some embodiments, this may allow SS bursts to vary within a cell based on frequency group, or vary at a frequency based on which cell is used.

In some embodiments, the maximum number of SS blocks 106, L, within an SS burst set (e.g., SS bursts 102, 104) may be carrier frequency dependent. For example, the available frequencies may be partitioned into two or more bands. In some embodiments, for frequency range category #A (e.g., 0~6 GHz), the number (L) is within L≤[16]. In some embodiments, for frequency range category #B (e.g., 6~60 GHz), the number is within L≤[128]. L may be selected for additional frequency range categories if desired.

The position(s) of actual transmitted SS blocks 106 can be informed for helping CONNECTED/IDLE mode measurement, for helping CONNECTED mode UE to receive DL data/control in unused SS blocks 106 and potentially for helping IDLE mode UE to receive DL data/control in unused SS blocks 106. In some embodiments, this information is available in CONNECTED mode. In some embodiments, this information is available in one or in both of connected and idle modes. The position(s) may be signaled in a variety of ways including direct signaling, SIB, or a configuration procedure.

In some embodiments, measurement gap configuration may be per band. A gap may be a network configured gap and/or an autonomous gap. For example, the network may configure the gap to be used for different bands and each UE may assume the gap configuration based on what frequency band group a frequency carrier belongs to. In some embodiments, a UE may use one radio frequency (RF) chain working for one band group (bands below x GHz, e.g., x=6) while using another RF chain working for another band group (bands above y GHz, e.g., y=6). For example, a frequency spectrum may be partitioned into two frequency groups FR1 and FR2, where FR1 is a frequency group for frequencies less than 6 GHz and FR2 is a frequency group for frequencies greater than 6 GHz. A gap might be configured in one band group but may not cause any interruption to the carriers in another band group. This gap may be considered as the gap for a specific band group, such as a gap per-band group.

As an example, consider a UE working on carrier A, B, C and D, where A and B are in band group 1 and C and D are in band group 2, and band group 1 may include all the bands whose central frequency is below x GHz while band group 2 includes all the bands whose central frequency is above y GHz. If the UE is configured to measure or synchronize a target cell on carrier E where carrier E is in band group 2, then the UE may interrupt the transmission (Tx)/reception (Rx) on carrier C and D while keeping the Tx/Rx on carrier A and B, since the target cell is in band group 2 and a per-band group gap is configured.

Figure 2:
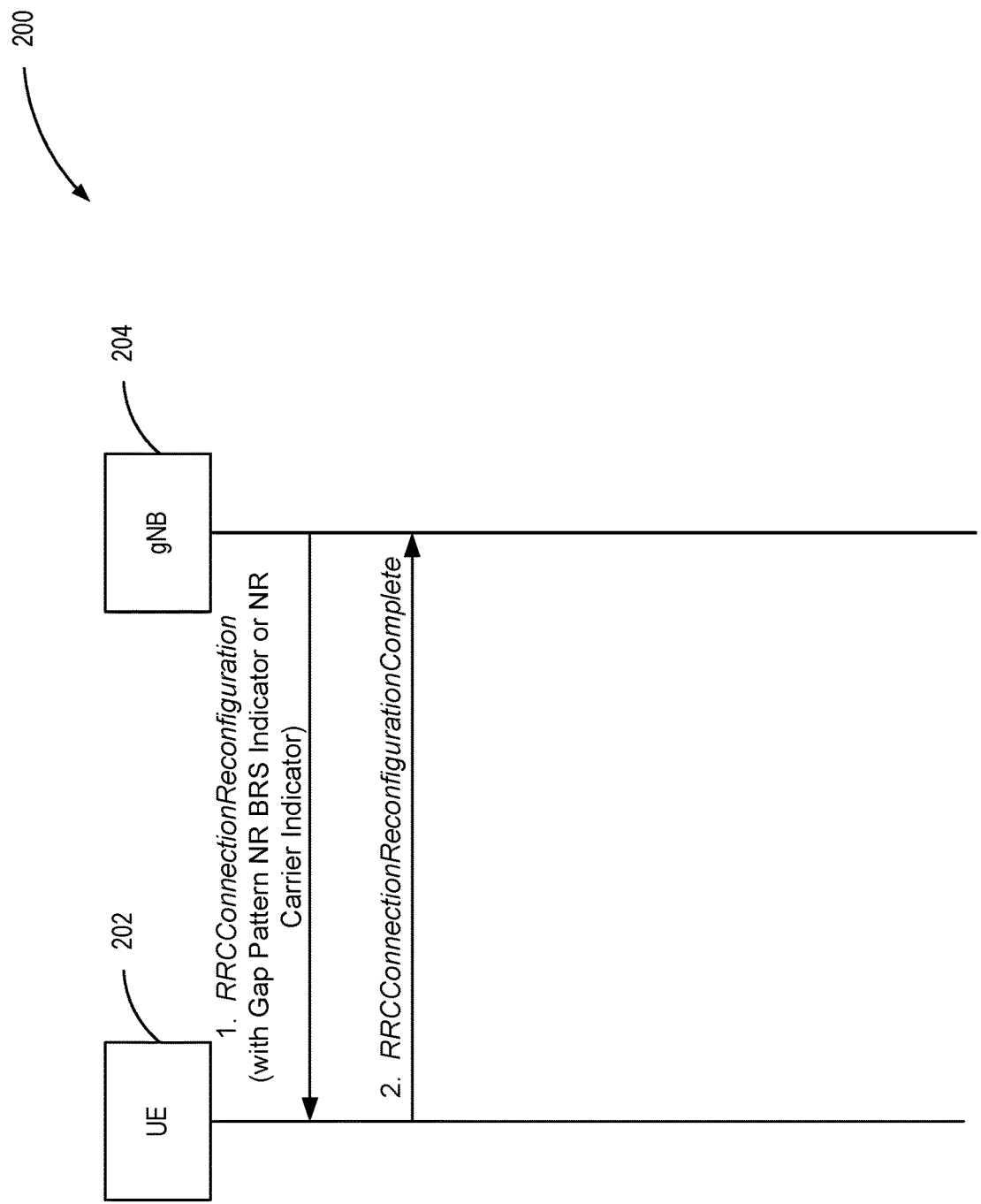
FIG. 2 is a block diagram of RRCConnectionReconfiguration message and response consistent with embodiments disclosed herein.

FIG. 2 is a block diagram of RRCConnectionReconfiguration message and response 200 consistent with embodiments disclosed herein. In some embodiments, the information elements can be signaled directly to a UE 202 by a gNB 204. The gNB 204 can determine a gap pattern for the UE 202 use based on cell or frequency group. The gNB 204 sends the UE 202 a RRCConnectionReconfiguration message that includes the measurement gap pattern information per cell and/or frequency. The measurement gap pattern information may associate a cell and/or frequency with measurement gap periodicity. The UE 202 can acknowledge the message with a RRCConnectionReconfigurationComplete message and use the gap pattern for detection and/or measurement of NR BRS.

Measurement gap elements/fields can be signaled to the UE via a system information block (SIB), dedicated signaling, as part of an attach/handover configuration procedure, or as part of a measurement configuration.

Figure 3:
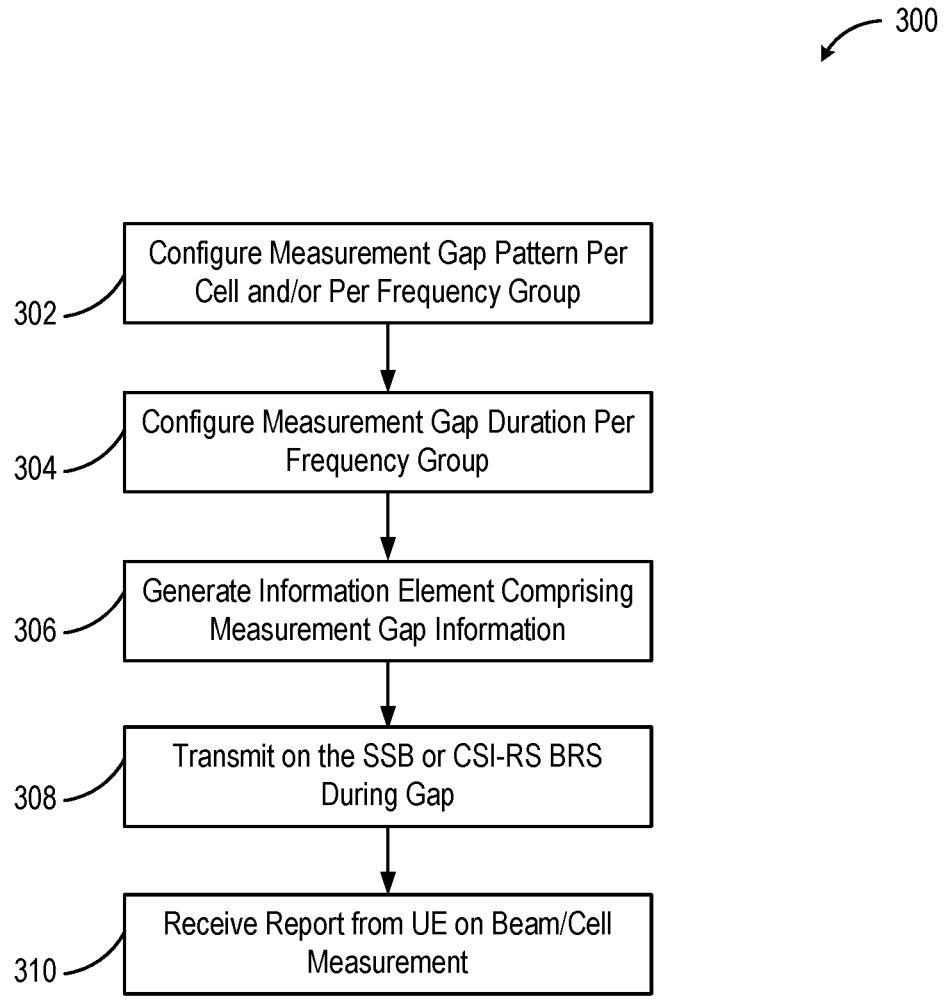
FIG. 3 is a flow chart illustrating a method for performing beam measurements in a cellular network consistent with embodiments disclosed herein.

FIG. 3 is a flow chart illustrating a method 300 for performing beam measurements in a cellular network consistent with embodiments disclosed herein. The method can be performed by systems such as those shown in FIG. 4, including UE 401 and RAN 410.

In block 302, a gNB configures a measurement gap pattern per cell and/or per frequency group. This measurement gap pattern may provide the periodicity, MGL, offset of the measurement gap. The measurement gap pattern may be based on the cell to be measured or what frequency group the frequency to be measured belongs to.

In block 304, the gNB configures the measurement gap duration per frequency band group. For instance, the gNB may partition a frequency spectrum to form a first frequency band group (e.g. FR1) and a second frequency band group (e.g. FR2). Each band group may be associated with a measurement gap duration defining the number of SS blocks per SS burst. In some embodiments, there may be two or more band groups. For example, the first frequency band group may be above 6 GHz and the second frequency band group may be at or below 6 GHz. In some embodiments, additional band groups may be formed. This may result in three or more band groups that can each be configured with a measurement gap.

In block 306, the gNB generates an information element comprising measurement gap information. The UE may decode the information element to obtain measurement configurations. In some embodiments, where the measurement gap pattern is configured based on frequency, a measurement information element can include the following:

```
-- ASN1START
MeasInfoList-NR ::=        SEQUENCE (SIZE (1..maxFreq)) OF MeasInfo-NR
MeasInfo-NR ::=            CHOICE{
    release                    SEQUENCE {
        freqCarrier                measFreqInfo,
    },
    setup                      SEQUENCE {
        freqCarrier                measFreqInfo,
        ssBurstSetPeriodicity      ENUMERATED (5ms, 10ms, 20ms, 40ms,
                                   80ms, 160ms, spare1, spare2),
    }
}
-- ASN1STOP
```

Each cell to be measured may be associated with a measurement configuration. In some embodiments, where the measurement gap pattern is configured based on a cell, a measurement information element can include the following:

```
-- ASN1START
MeasInfoList-NR ::=        SEQUENCE (SIZE (1..maxCellID)) OF MeasInfo-NR
MeasInfo-NR ::=            CHOICE{
    release                    SEQUENCE {
        cellInfo                   measCellInfo,
    },
    setup                      SEQUENCE {
        cellID                     measCellInfo,
        ssBurstSetPeriodicity      ENUMERATED (5ms, 10ms, 20ms, 40ms,
                                       80ms, 160ms, spare1, spare2),
    }
}
-- ASN1END
```

In some embodiments, where the measurement gap pattern is configured based on a cell and frequency, a measurement information element can include the following:

```
-- ASN1START
MeasInfoList-NR ::=        SEQUENCE (SIZE (1..maxCellID+maxFreq)) OF MeasInfo-NR
MeasInfo-NR ::=            CHOICE{
    release                    SEQUENCE {
        cellOrFreq                 CHOICE {
            cellID                     measCellInfo,
            freqCarrier                measFreqInfo
        }
    }                          SEQUENCE {
    setup
        cellID                     measCellInfo,
        ssBurstSetPeriodicity      ENUMERATED {5ms, 10ms, 20ms, 40ms,
    }
}
-- ASN1END
```

The fields of measFreqInfo and measCellInfo can be provided to the UE so the UE can perform measurement on the cell and frequency of all cells. MeasCellInfo can include cell ID (such as PCI) information. Both information may contain time and frequency resources that the SS burst will be allocated. Both information may contain central frequency, bandwidth, and other information for measurement.

In block 308, the gNB transmits on an SSB or CSI-RS for a specific beam or cell during the gap. In block 310, the gNB receives a report from the UE regarding the beam/cell measurement(s).

Figure 4:
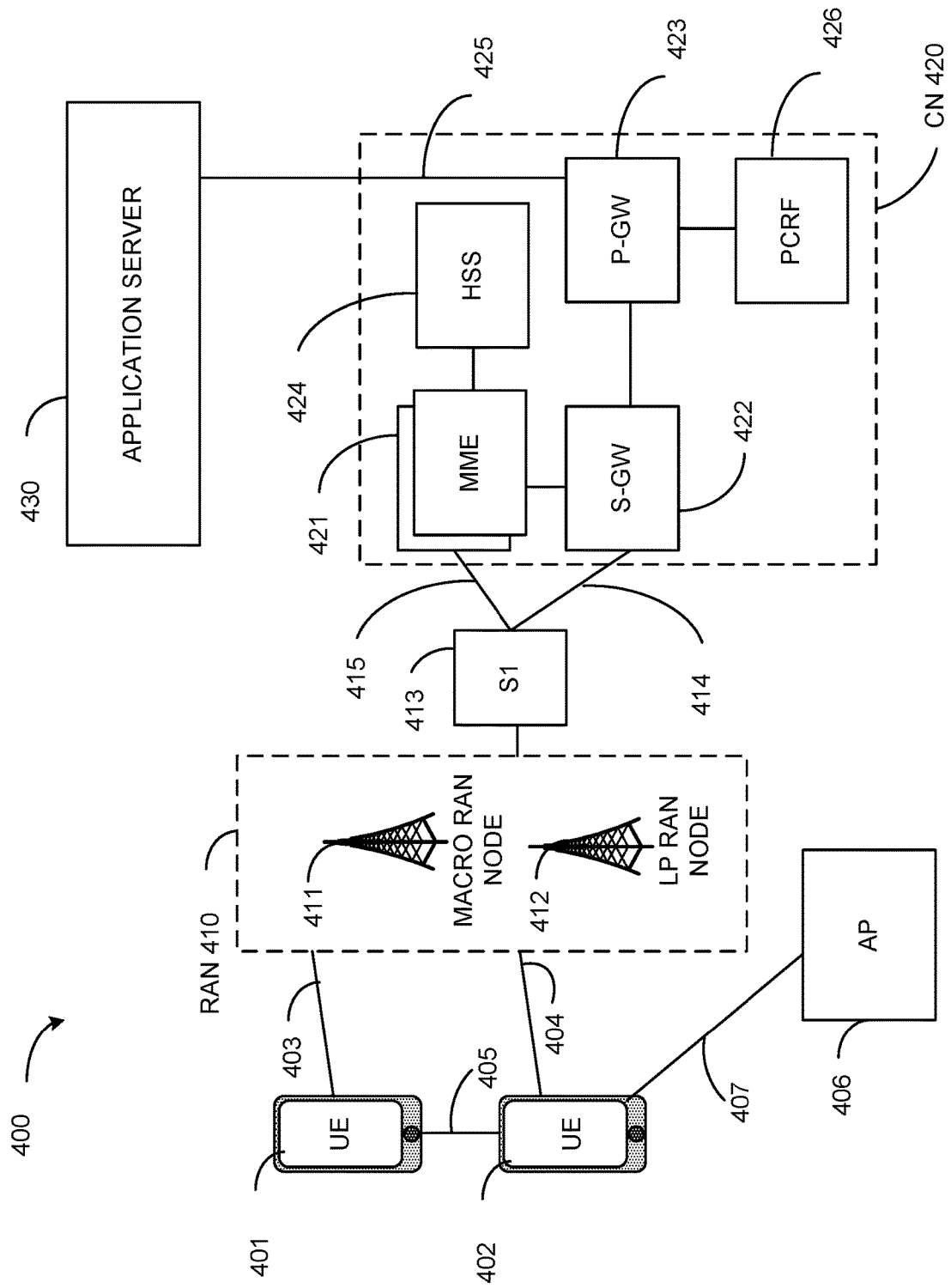
FIG. 4 is an architecture of a system of a network consistent with embodiments disclosed herein.

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410. The RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 may be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 402 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment the S1 interface 413 is split into two parts: the S1-U interface 414, which carries traffic data between the RAN nodes 411 and 412 and a serving gateway (S-GW) 422, and an S1-mobility management entity (MME) interface 415, which is a signaling interface between the RAN nodes 411 and 412 and MMEs 421.

In this embodiment, the CN 420 comprises the MMEs 421, the S-GW 422, a Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the CN 420 (e.g., an EPC network) and external networks such as a network including the application server 430 (alternatively referred to as application function (AF)) via an Internet Protocol (IP) interface 425. Generally, an application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be a node for policy enforcement and charging data collection. A Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
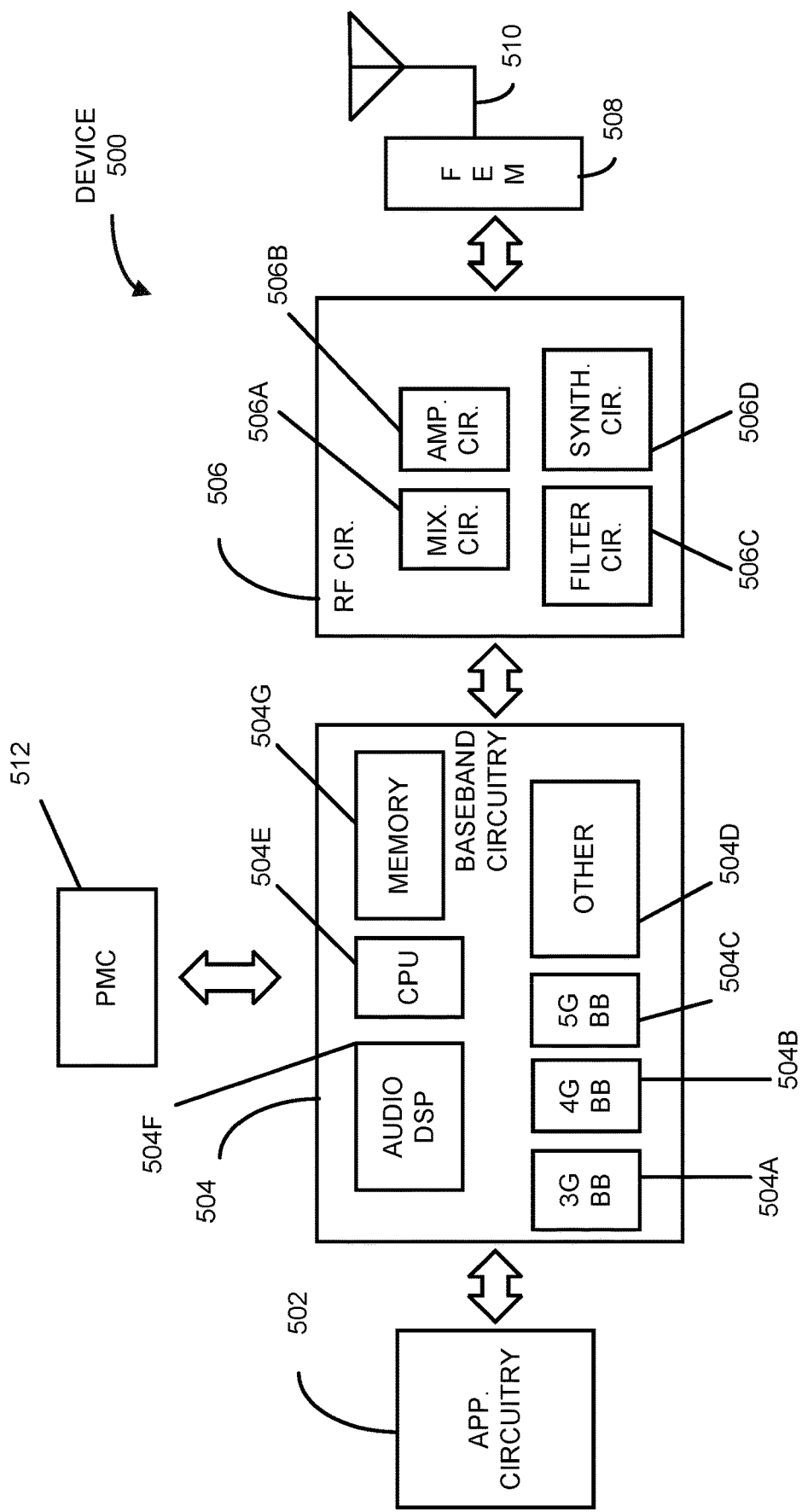
FIG. 5 is a diagram illustrating example components of a device consistent with embodiments disclosed herein.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include fewer elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.).

The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. The RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506A, amplifier circuitry 506B and filter circuitry 506C. In some embodiments, the transmit signal path of the RF circuitry 506 may include filter circuitry 506C and mixer circuitry 506A. RF circuitry 506 may also include synthesizer circuitry 506D for synthesizing a frequency for use by the mixer circuitry 506A of the receive signal path and the transmit signal path. In some embodiments, the mixer circuitry 506A of the receive signal path may be configured to down-convert RF signals received from the FEM circuitry 508 based on the synthesized frequency provided by synthesizer circuitry 506D. The amplifier circuitry 506B may be configured to amplify the down-converted signals and the filter circuitry 506C may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, the mixer circuitry 506A of the receive signal path may comprise passive mixers, although the scope of the embodiments is not limited in this respect.

In some embodiments, the mixer circuitry 506A of the transmit signal path may be configured to up-convert input baseband signals based on the synthesized frequency provided by the synthesizer circuitry 506D to generate RF output signals for the FEM circuitry 508. The baseband signals may be provided by the baseband circuitry 504 and may be filtered by the filter circuitry 506C.

In some embodiments, the mixer circuitry 506A of the receive signal path and the mixer circuitry 506A of the transmit signal path may include two or more mixers and may be arranged for quadrature downconversion and upconversion, respectively. In some embodiments, the mixer circuitry 506A of the receive signal path and the mixer circuitry 506A of the transmit signal path may include two or more mixers and may be arranged for image rejection (e.g., Hartley image rejection). In some embodiments, the mixer circuitry 506A of the receive signal path and the mixer circuitry 506A may be arranged for direct downconversion and direct upconversion, respectively. In some embodiments, the mixer circuitry 506A of the receive signal path and the mixer circuitry 506A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506D may be a fractional-N synthesizer or a fractional N/N+1 synthesizer, although the scope of the embodiments is not limited in this respect as other types of frequency synthesizers may be suitable. For example, synthesizer circuitry 506D may be a delta-sigma synthesizer, a frequency multiplier, or a synthesizer comprising a phase-locked loop with a frequency divider.

The synthesizer circuitry 506D may be configured to synthesize an output frequency for use by the mixer circuitry 506A of the RF circuitry 506 based on a frequency input and a divider control input. In some embodiments, the synthesizer circuitry 506D may be a fractional N/N+1 synthesizer.

In some embodiments, frequency input may be provided by a voltage controlled oscillator (VCO), although that is not a requirement. Divider control input may be provided by either the baseband circuitry 504 or the application circuitry 502 (such as an applications processor) depending on the desired output frequency. In some embodiments, a divider control input (e.g., N) may be determined from a look-up table based on a channel indicated by the application circuitry 502.

Synthesizer circuitry 506D of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 506D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. The FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM circuitry 508, or in both the RF circuitry 506 and the FEM circuitry 508.

In some embodiments, the FEM circuitry 508 may include a TX/RX switch to switch between transmit mode and receive mode operation. The FEM circuitry 508 may include a receive signal path and a transmit signal path. The receive signal path of the FEM circuitry 508 may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by the RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device 500 is included in a UE. The PMC 512 may increase the power conversion efficiency while providing desirable implementation size and heat dissipation characteristics.

FIG. 5 shows the PMC 512 coupled only with the baseband circuitry 504. However, in other embodiments, the PMC 512 may be additionally or alternatively coupled with, and perform similar power management operations for, other components such as, but not limited to, the application circuitry 502, the RF circuitry 506, or the FEM circuitry 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
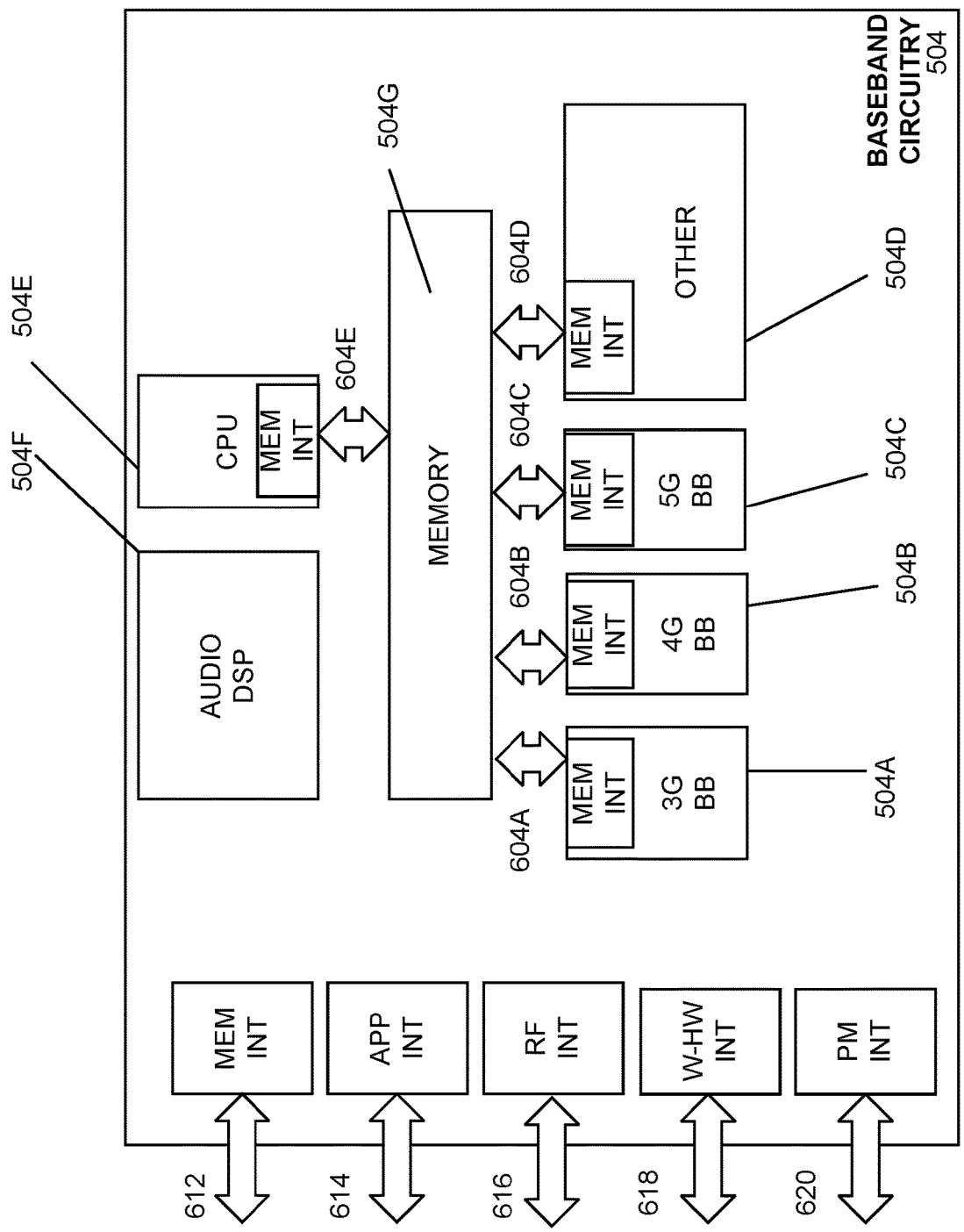
FIG. 6 is a diagram illustrating example interfaces of baseband circuitry consistent with embodiments disclosed herein.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512.

Figure 7:
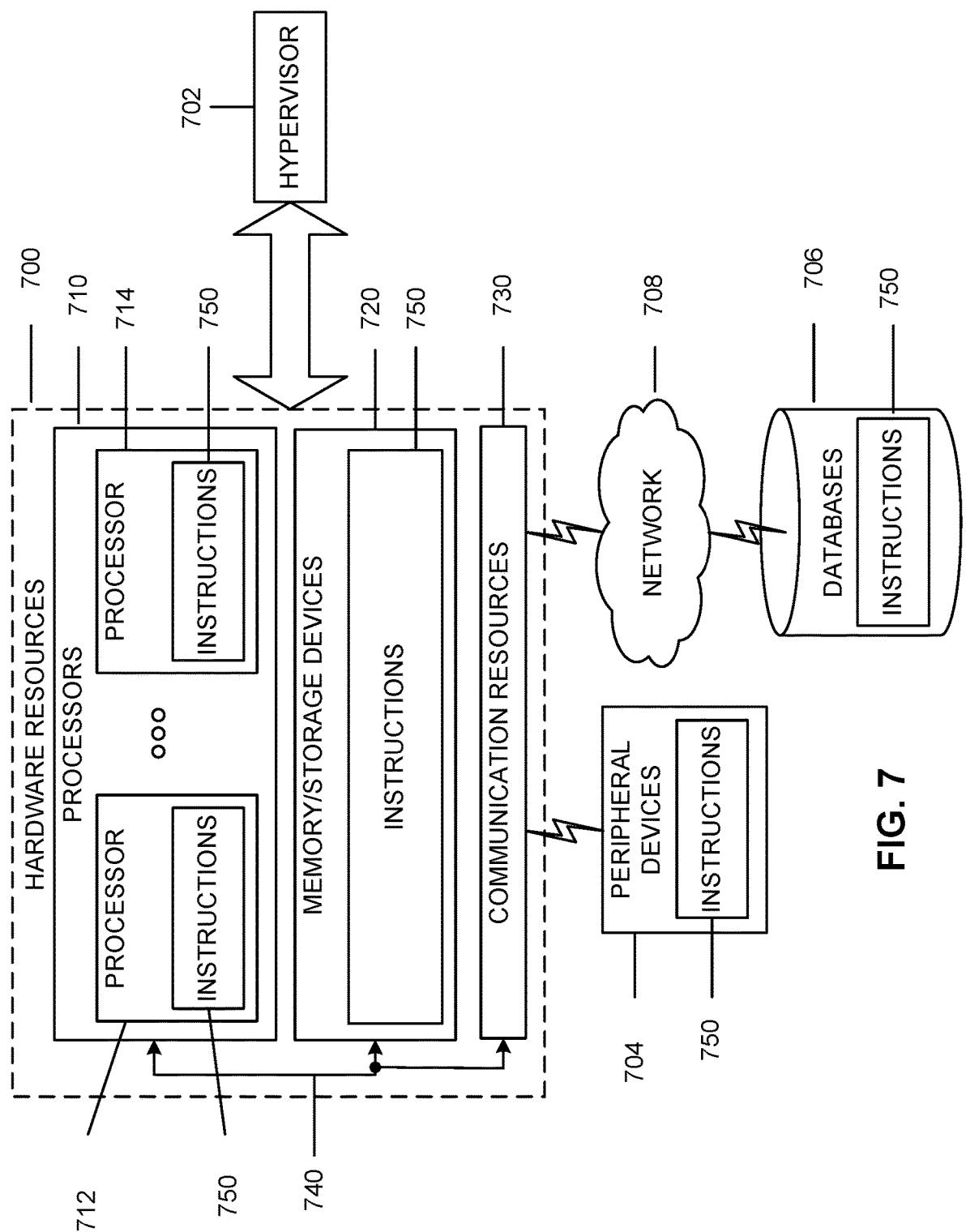
FIG. 7 is a block diagram illustrating components able to read instructions from a machine-readable or computer-readable medium consistent with embodiments disclosed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

EXAMPLES

The following examples pertain to further embodiments.
Example 1 is an apparatus for a user equipment (UE), comprising: a memory interface and a baseband processing unit. The memory interface to access a message describing a measurement configuration. The baseband processing unit to: decode the message describing the measurement configuration, the message comprising time and frequency resources, and a duration for measurement gaps, wherein the time and frequency resources are carrier frequency dependent; identify a frequency to be measured; determine the time and frequency resources for the measurement gaps based on the frequency to be measured; and perform a set of measurements according to the determined time and frequency resources and the duration for the measurement gaps.

Example 2 is the apparatus of Example 1, wherein the baseband processing unit is further configured to generate a report from the UE to a radio access network (RAN) node providing results of the set of measurements.

Example 3 is the apparatus of Example 1, wherein the message is a radio resource control (RRC) message.

Example 4 is the apparatus of Example 1, wherein the baseband processing unit assumes that all cells using the frequency have the time and frequency resources.

Example 5 is the apparatus of any of Examples 1-4, wherein the duration for measurement gaps is frequency dependent.

Example 6 is the apparatus of Example 5, wherein the baseband processing unit is further to determine the duration by identifying what frequency band group of a plurality of frequency band groups the frequency to be measured belongs to.

Example 7 is the apparatus of Example 6, wherein the plurality of frequency band groups comprise a first frequency band corresponding with a first communications standard, and a second frequency band corresponding with a second communications standard.

Example 8 is an apparatus for a radio access network (RAN) node comprising: a memory interface and a baseband processing unit. The memory interface to send or receive information about measurement gap patterns for one or more cells. The baseband processing unit to: configure a cell to be associated with a measurement gap pattern; generate a message for a user equipment (UE), the message indicating that a cell to be measured is configured according to the measurement gap pattern; and prevent scheduling the UE during a measurement gap of the measurement gap pattern.

Example 9 is the apparatus of Example 8, wherein the message associates a cell identifier with the measurement gap pattern.

Example 10 is the apparatus of Example 9, wherein the cell identifier is a physical cell identifier (PCI).

Example 11 is the apparatus of Example 8, wherein the message is part of a handover configuration procedure.

Example 12 is the apparatus of Example 8, wherein the message is part of a measurement configuration procedure.

Example 13 is the apparatus of any of Examples 8-12, wherein the baseband processing unit is further to determine a duration of measurement gaps in the measurement gap pattern based on a carrier frequency used by the UE while performing signal measurements with the cell, wherein if the carrier frequency is above 6 GHz the duration will be a first length, and if the carrier frequency is below 6 GHz the duration will be a second length.

Example 14 is a method of performing signal strength measurements in a cellular network comprising: configuring, by a radio access network (RAN) node, a measurement gap pattern for a cell and a carrier frequency; generating an information element for a user equipment (UE) that is to measure signal strength with the cell using the carrier frequency, indicating that the cell on the carrier frequency has been configured with the measurement gap pattern; avoiding scheduling the UE during gaps of the measurement gap pattern; and processing a report from the UE providing results of measurements taken during the gaps of the measurement gap pattern.

Example 15 is the method of Example 14, further comprising configuring a duration of the gaps of the measurement gap pattern wherein the duration of the gaps is based on the carrier frequency.

Example 16 is the method of Example 14, further comprising determining which band group the carrier frequency belongs to; and configuring the gaps of the measurement gap pattern to have a duration associated with the band group to which the carrier frequency belongs.

Example 17 is an apparatus comprising means to perform a method as exemplified in any of Examples 14-16.

Example 18 is a machine readable medium including code, when executed, to cause a machine to perform the method of any one of Examples 14-16.

Example 19 is a computer-readable storage medium that stores machine-readable instructions that, when executed by one or more processors of a radio access network (RAN) node, cause the one or more processors to perform operations comprising: partition a frequency spectrum to form a first frequency band group and a second frequency band group; configure a first measurement gap for the first frequency band group and a second measurement gap for the second frequency band group; generate an information element for a user equipment (UE), the information element informing the UE of a configuration for the first measurement gap and the second measurement gap; and prevent scheduling the UE during the first measurement gap on frequencies within the first frequency band group and during the second measurement gap on frequencies within the second frequency band group.

Example 20 is the computer-readable storage medium of Example 19, wherein to configure the first and second measurement gaps, a number of subframes for each measurement gap is defined.

Example 21 is the computer-readable storage medium of Example 19, wherein the first frequency band group is above 6 GHz and the second frequency band group is at or below 6 GHz.

Example 22 is the computer-readable storage medium of Example 19, wherein the frequency spectrum is further partitioned to form a third frequency band group.

Example 23 is the computer-readable storage medium of any of Examples 19-22, wherein the first measurement gap is configured to not interrupt carriers in the second measurement gap.

Additional Examples

Additional Example 1 may include a system comprising an NR measurement configuration per frequency.

Additional Example 2 may include a system comprising an NR measurement configuration per cell.

Additional Example 2 may be combined with example 1 and/or some other examples herein.

Additional Example 3 may include a system comprising an NR measurement configuration per frequency or per cell. Example 3 may be combined with examples 1-2 and/or some other examples herein.

Additional Example 4 may include a system comprising an NR measurement gap configuration per band. Example 4 may be combined with examples 1-3 and/or some other examples herein.

Additional Example 5 may include an apparatus comprising: means for generating a measurement configuration message, wherein the measurement configuration message includes a per-frequency measurement configuration indicating to measure signals on a per-frequency basis and/or a per-cell measurement configuration indicating to measure signals on a per-cell basis; and means for signaling the measurement configuration.

Additional Example 6 may include the apparatus of additional example 5 and/or some other examples herein, wherein the measurement configuration message further includes a measurement gap configuration per band.

Additional Example 7 may include the apparatus of additional example 6 and/or some other examples herein, wherein the measurement gap configuration per band indicates measurement gaps for one or more band groups, and the measurement gaps for a band group is configured such that measurements performed during the measurement gaps do not cause interruptions to the carriers in another band group.

Additional Example 8 may include the apparatus of additional examples 5-7 and/or some other examples herein, wherein the per-cell measurement configuration may indicate cell identifier (ID) information, such as a physical cell ID (PCI); the per-cell measurement configuration and the per-frequency measurement configuration comprise time and/or frequency resources in which a synchronization signal (SS) burst is allocated; and the per-cell measurement configuration and the per-frequency measurement configuration indicate a central frequency, bandwidth, and other like information need to perform measurements.

Additional Example 9 may include the apparatus of additional examples 5-8 and/or some other examples herein, wherein the measurement configuration message is to be signaled in a system information block (SIB), via dedicated signaling, as part of an attachment and/or handover configuration procedure, and/or as part of a measurement configuration procedure.

Additional Example 10 may include the apparatus of additional examples 5-9 and/or some other examples herein, wherein the apparatus is implemented in or by an evolved nodeB (eNB) or a next generation nodeB (gNB).

Additional Example 11 may include an apparatus comprising: means for receiving a measurement configuration message, wherein the measurement configuration message includes a per-frequency measurement configuration indicating to measure signals on a per-frequency basis and/or a per-cell measurement configuration indicating to measure signals on a per-cell basis; and means for measuring one or more signals according to the per-frequency configuration and/or the per-cell measurement configuration.

Additional Example 12 may include the apparatus of additional example 11 and/or some other examples herein, wherein the measurement configuration message further includes a measurement gap configuration per band indicating measurement gaps in which to perform the measurements.

Additional Example 13 may include the apparatus of additional example 12 and/or some other examples herein, wherein the measurement gap configuration per band indicates measurement gaps for one or more band groups, and the measurement gaps for a band group is configured such that measurements performed during the measurement gaps do not cause interruptions to the carriers in another band group.

Additional Example 14 may include the apparatus of additional examples 11-13 and/or some other examples herein, wherein the per-cell measurement configuration may indicate cell identifier (ID) information, such as a physical cell ID (PCI); the per-cell measurement configuration and the per-frequency measurement configuration comprise time and/or frequency resources in which a synchronization signal (SS) burst is allocated; and the per-cell measurement configuration and the per-frequency measurement configuration indicate a central frequency, bandwidth, and other like information need to perform measurements.

Additional Example 15 may include the apparatus of examples 11-14 and/or some other examples herein, wherein the measurement configuration message is to be signaled in a system information block (SIB), via dedicated signaling, as part of an attachment and/or handover configuration procedure, and/or as part of a measurement configuration procedure.

Additional Example 16 may include the apparatus of additional examples 11-15 and/or some other examples herein, wherein the apparatus is implemented in or by a user equipment (UE).

Additional Example 17 may include an apparatus including means to perform one or more elements of a method described in or related to any of additional examples 1-16, or any other method or process described herein.

Additional Example 18 may include one or more non-transitory computer-readable media comprising instructions to cause an electronic device, upon execution of the instructions by one or more processors of the electronic device, to perform one or more elements of a method described in or related to any of additional examples 1-16, or any other method or process described herein.

Additional Example 19 may include an apparatus comprising logic, modules, and/or circuitry to perform one or more elements of a method described in or related to any of additional examples 1-16, or any other method or process described herein.

Additional Example 20 may include a method, technique, or process as described in or related to any of additional examples 1-16, or portions or parts thereof.

Additional Example 21 may include an apparatus comprising: one or more processors and one or more computer readable media comprising instructions that, when executed by the one or more processors, cause the one or more processors to perform the method, techniques, or process as described in or related to any of additional examples 1-16, or portions thereof.

Additional Example 22 may include a method of communicating in a wireless network as shown and described herein.

Additional Example 23 may include a system for providing wireless communication as shown and described herein.

Additional Example 24 may include a device for providing wireless communication as shown and described herein.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "for example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. An apparatus for a user equipment (UE), comprising:
a memory interface to access a message describing a measurement configuration;
a baseband processing unit to:
decode the message describing the measurement configuration, the message comprising time and frequency resources, and a duration for measurement gaps, wherein the time and frequency resources are carrier frequency dependent;
identify a frequency to be measured;
determine the time and frequency resources for the measurement gaps based on the frequency to be measured,
wherein the duration for measurement gaps is frequency dependent, wherein if the frequency to be measured is above 6 GHz the duration will be a first length, and if the frequency to be measured is below 6 GHz the duration will be a second length; and
perform a set of measurements according to the determined time and frequency resources and the duration for the measurement gaps.

2. The apparatus of claim 1, wherein the baseband processing unit is further configured to generate a report from the UE to a radio access network (RAN) node providing results of the set of measurements.

3. The apparatus of claim 1, wherein the message is a radio resource control (RRC) message.

4. The apparatus of claim 1, wherein the baseband processing unit is further to determine the duration by identifying what frequency band group of a plurality of frequency band groups the frequency to be measured belongs to.

5. The apparatus of claim 4, wherein the plurality of frequency band groups comprise a first frequency band corresponding with a first communications standard, and a second frequency band corresponding with a second communications standard.

6. An apparatus for a radio access network (RAN) node comprising:
a memory interface to send or receive information about measurement gap patterns for one or more cells;
a baseband processing unit to:
configure a cell to be associated with a measurement gap pattern;
generate a message for a user equipment (UE), the message indicating that a cell to be measured is configured according to the measurement gap pattern; and
prevent scheduling the UE during a measurement gap of the measurement gap pattern,
wherein the baseband processing unit is further to determine a duration of measurement gaps in the measurement gap pattern based on a carrier frequency used by the UE while performing signal measurements with the cell, wherein if the carrier frequency is above 6 GHz the duration will be a first length, and if the carrier frequency is below 6 GHz the duration will be a second length.

7. The apparatus of claim 6, wherein the message associates a cell identifier with the measurement gap pattern.

8. The apparatus of claim 7, wherein the cell identifier is a physical cell identifier (PCI).

9. The apparatus of claim 6, wherein the message is part of a handover configuration procedure.

10. The apparatus of claim 6, wherein the message is part of a measurement configuration procedure.

11. A method of performing signal strength measurements in a cellular network comprising:
configuring, by a radio access network (RAN) node, a measurement gap pattern for a cell and a carrier frequency;
configuring a duration of the gaps of the measurement gap pattern wherein the duration of the gaps is based on the carrier frequency, wherein if the carrier frequency is above 6 GHz the duration will be a first length, and if the carrier frequency is below 6 GHz the duration will be a second length;
generating an information element for a user equipment (UE) that is to measure signal strength with the cell using the carrier frequency, indicating that the cell on the carrier frequency has been configured with the measurement gap pattern;
avoiding scheduling the UE during gaps of the measurement gap pattern; and
processing a report from the UE providing results of measurements taken during the gaps of the measurement gap pattern.

12. The method of claim 11, further comprising determining which band group the carrier frequency belongs to; and
configuring the gaps of the measurement gap pattern to have a duration associated with the band group to which the carrier frequency belongs.

13. A computer-readable storage medium that stores machine-readable instructions that, when executed by one or more processors of a radio access network (RAN) node, cause the one or more processors to perform operations comprising:
partition a frequency spectrum to form a first frequency band group and a second frequency band group, wherein the first frequency band group is above 6 GHz and the second frequency band group is at or below 6 GHz;
configure a first measurement gap for the first frequency band group and a second measurement gap for the second frequency band group;
generate an information element for a user equipment (UE), the information element informing the UE of a configuration for the first measurement gap and the second measurement gap; and
prevent scheduling the UE during the first measurement gap on frequencies within the first frequency band group and during the second measurement gap on frequencies within the second frequency band group.

14. The computer-readable storage medium of claim 13, wherein to configure the first and second measurement gaps, a number of subframes for each measurement gap is defined.

15. The computer-readable storage medium of claim 13, wherein the frequency spectrum is further partitioned to form a third frequency band group.

16. The computer-readable storage medium of claim 13, wherein the first measurement gap is configured to not interrupt carriers in the second measurement gap.

* * * * *